United States Patent [19]
Petruchik

[11] Patent Number: 5,394,214
[45] Date of Patent: Feb. 28, 1995

[54] COMPACT CAMERA WITH FILM MAGAZINE

[75] Inventor: Dwight J. Petruchik, Honeoye Falls, N.Y.

[73] Assignee: Eastman Kodak Company, Rochester, N.Y.

[21] Appl. No.: 200,983

[22] Filed: Feb. 24, 1994

[51] Int. Cl.⁶ .............................................. G03B 17/02
[52] U.S. Cl. .................................................... 354/288
[58] Field of Search ...................... 354/173, 288, 145.1, 354/149.11

[56] References Cited

U.S. PATENT DOCUMENTS

| | | | |
|---|---|---|---|
| 2,989,906 | 6/1961 | Rentschler | 354/149.11 |
| 3,096,699 | 7/1963 | Harvey et al. | 354/173 |
| 3,481,261 | 12/1969 | Fischer et al. | 354/149.11 |
| 4,344,685 | 8/1982 | Milatz et al. | 354/173 |
| 4,351,599 | 9/1982 | Suzuki et al. | 354/173 |
| 4,992,810 | 2/1991 | Schappler | 354/149.11 |
| 5,001,505 | 3/1991 | Tosaka et al. | 354/149.11 |

FOREIGN PATENT DOCUMENTS 266588 11/1968 Austria .
762194 7/1967 Canada .
39780 2/1991 Japan .

*Primary Examiner*—Michael L. Gellner
*Assistant Examiner*—Nicholas J. Tuccillo
*Attorney, Agent, or Firm*—Roger A. Fields

[57] ABSTRACT

A photographic camera for use with a size-126 type film magazine includes a flash capacitor that projects from a film advance thumbwheel to be received in a coaxial bore of the magazine's film take-up spool, to guide the spool into rotational engagement with the thumbwheel and to serve as a fulcrum support about which the film magazine can be pivoted into the camera. Electrical contacts connected to the flash capacitor are located in the camera to abut respective contacts of a battery inside the film magazine, when the film magazine is pivoted about the capacitor into the camera.

6 Claims, 3 Drawing Sheets

5,394,214

COMPACT CAMERA WITH FILM MAGAZINE

FIELD OF THE INVENTION

The invention relates generally to the field of photography, and in particular to a camera and a film magazine. More specifically, the invention relates to a method of loading the film magazine into the camera.

BACKGROUND OF THE INVENTION

A standard size-126 film magazine comprises a film supply chamber, a film take-up chamber and an interconnecting bridge portion for guiding a filmstrip from a film roll in the supply chamber over a film exposure window of the bridge portion and onto a take-up spool in the take-up chamber. The take-up spool has a pair of opposite exposed ends at the magazine exterior at least one of which is engaged by a film winding key or the like in a camera to rotate the spool to take up successive exposed frames of the filmstrip.

Prior art U.S. Pat. No. 3,481,261, issued Dec. 2, 1969, discloses a size-126 film magazine that is modified from the standard one to include a battery within the confines of the film roll in the film supply chamber. This arrangement permits the camera to be made relatively compact. The two poles of the battery are engaged by metal ribbon pieces connected to exposed contacts at the magazine exterior. The film magazine is loaded into a camera in a conventional manner, i.e. by sliding it laterally into the camera, to force the exposed contacts against respective electrical contacts in the camera. Power from the battery is used to drive a film transport motor in the camera.

Prior art U.S. Pat. No. 4,344,685, issued Aug. 17, 1982, discloses a camera comprising upper and lower mating housing portions. The camera is made relatively compact by locating a battery fixed to the upper housing portion in a coaxial bore of a film spool supported in the lower housing portion and by locating a film drive motor fixed to the upper housing portion in a coaxial bore of a film take-up spool supported in the lower housing portion. The film drive motor includes a coupling member that is coupled with the film take-up spool at the bottom of its coaxial bore when the motor is inserted into the bore during assembly of the two housing portions together.

PROBLEM TO BE SOLVED BY THE INVENTION

Although the cameras disclosed in U.S. Pat. Nos. 3,481,261 and 4,344,685 are relatively compact, they could be made easier to load.

SUMMARY OF THE INVENTION

According to one aspect of the invention, a camera is intended to be used with a film magazine which contains a film take-up spool having an exposed end at the magazine exterior and a coaxial bore opening to the exposed end. The camera comprises:

rotatable film rewinding means for engaging the exposed end of the take-up spool at the magazine exterior to rotate the take-up spool; and a flash capacitor projecting longitudinally from the rewinding means to be received in the coaxial bore of the take-up spool to guide the film magazine for engagement of the exposed end of the take-up spool with the rewinding means.

According to another aspect of the invention, a camera is intended for a film magazine provided with a film supply chamber which contains a battery having a pair of exposed contacts at the magazine exterior and with a film take-up chamber which contains a film take-up spool having an exposed end at the magazine exterior and a coaxial bore opening to the exposed end. The camera comprises:

rotatable film rewinding means for engaging the exposed end of the take-up spool at the magazine exterior and rotating the take-up spool to wind a filmstrip from the film supply chamber into the film take-up chamber;

a holding compartment for receiving the film supply chamber of the film magazine;

a flash capacitor projecting longitudinally from the rewinding means to be received in the coaxial bore of the take-up spool to guide the film magazine for engagement of the exposed end of the take-up spool with the rewinding means and to serve as a fulcrum support about which the film magazine can be pivoted at the film take-up chamber to swing the film supply chamber into the holding compartment; and a pair of electrical contacts connected to the capacitor and located in the holding compartment to abut the exposed contacts of the battery when the film magazine is pivoted about the capacitor to swing the film supply chamber into the holding compartment.

ADVANTAGEOUS EFFECT OF THE INVENTION

The invention provides a compact camera that is relatively easy to load.

DETAILED DESCRIPTION OF THE INVENTION

The invention is disclosed as being embodied preferably in a camera and a size-126 film magazine. Because the features of the camera and the film magazine are generally known, the description which follows is directed in particular only to those elements forming part of or cooperating directly with the disclosed embodiment. It is to be understood, however, that other elements may take various forms known to a person of ordinary skill in the art.

The Film Magazine

Figure 1:
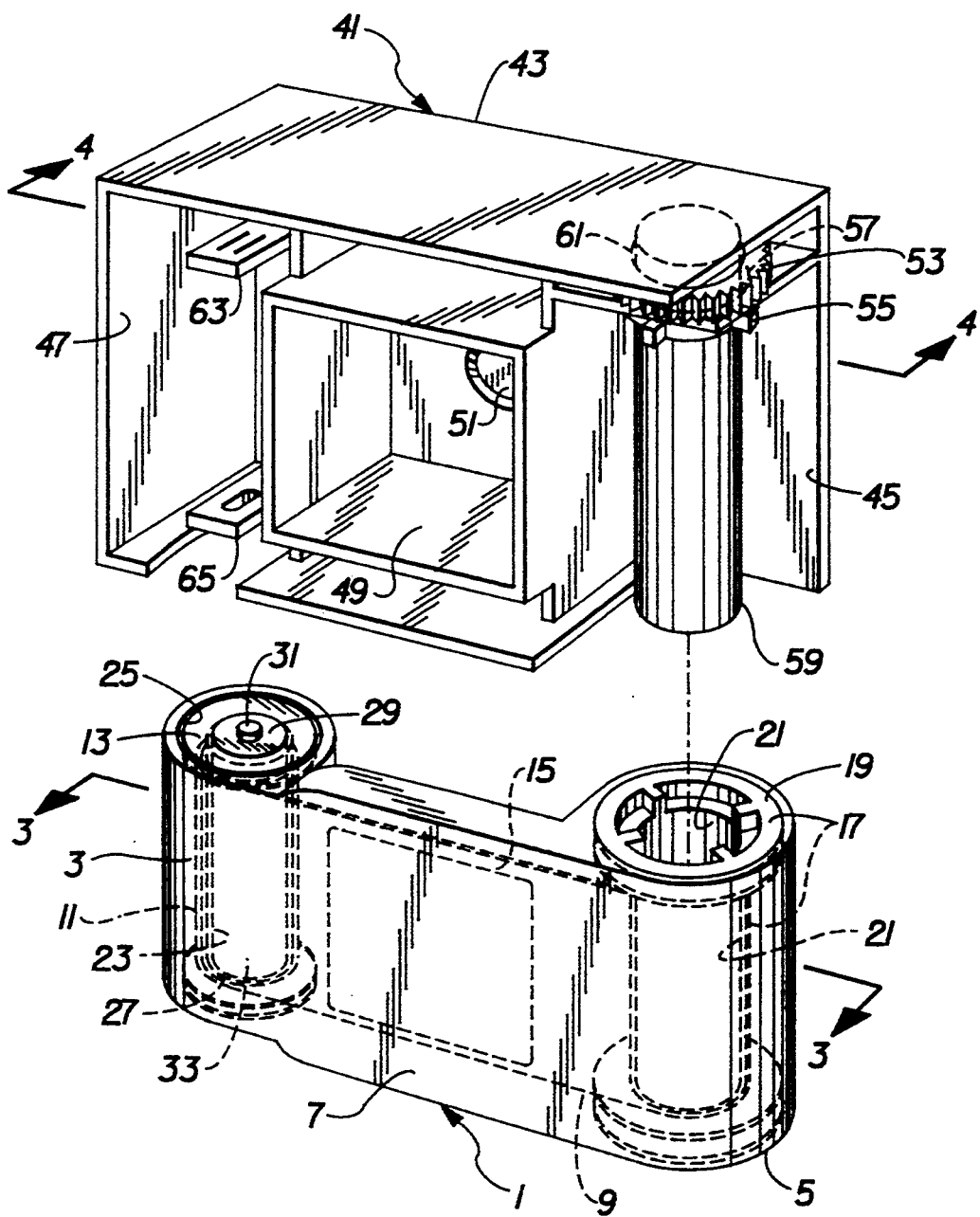
FIG. 1 is a rear perspective view of a camera and a size-126 film magazine according to a preferred embodiment of the invention.
Figure 2:
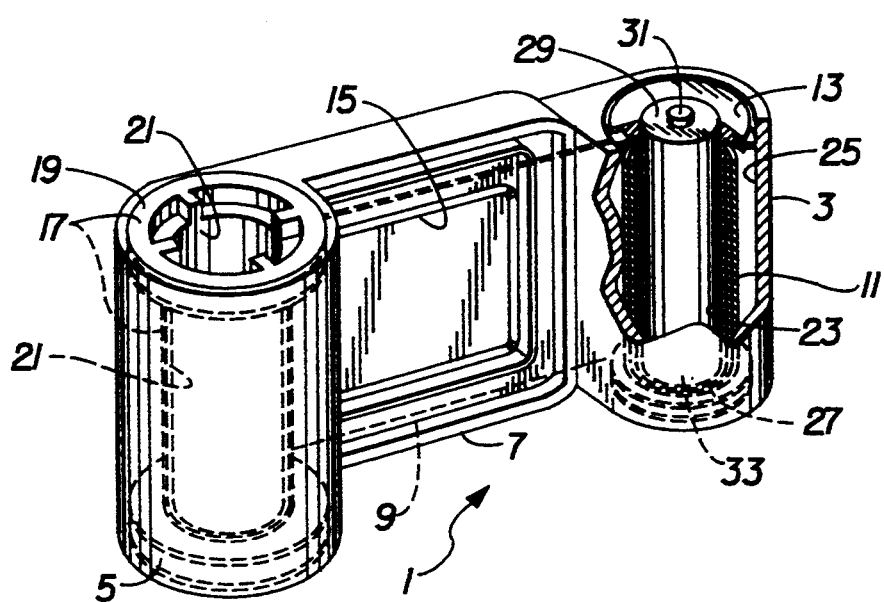
FIG. 2 is a front perspective view of the film magazine, showing a film supply chamber partly cut away to reveal a battery located within a coaxial hollow of a film supply spool supporting a film roll.
Figure 3:
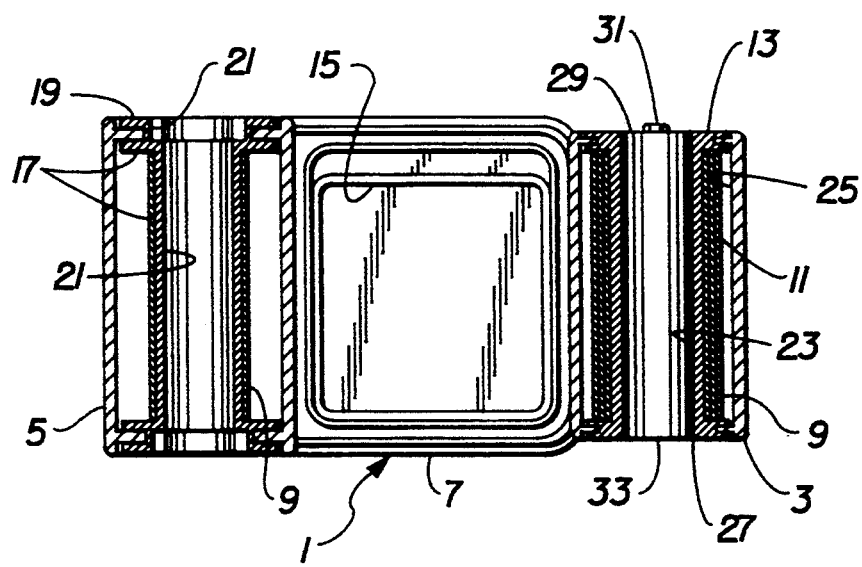
FIG. 3 is a cross-sectional view of the film magazine as seen in the direction of the arrows 3, 3 in FIG. 1.

Referring now to the drawings, FIGS. 1–3 show a size-126 film magazine 1 comprising a film supply chamber 3, a film take-up chamber 5, and an interconnecting bridge portion 7 for guiding a filmstrip 9 from a film roll 11 on a rotatable film supply spool 13 in the film supply chamber over a rectangular exposure window 15 of the bridge portion and onto a rotatable film take-up spool 17 in the film take-up chamber. The take-up spool 17 has an exposed top end 19 at the magazine exterior which is engageable to rotate the spool to take up successive exposed frames of the filmstrip 9, and it has a coaxial bore 21 opening to the top end. The supply spool 13 has a coaxial bore 23 opening to the magazine exterior at top and bottom ends 25 and 27 of the bore. A conventional battery 29 is fixed to the supply spool 13 within the coaxial bore 23, to rotate with the spool, and it has positive and negative exposed poles 31 and 33 protruding slightly from or at least flush with the top and bottom ends 25 and 27 of the bore.

The Camera

A camera 41 has a body or housing 43 with a holding compartment 45 for the take-up chamber 5 of the film magazine 1, a holding compartment 47 for the supply chamber 3 of the film magazine, and a backframe opening 49 that is aligned with the exposure window 15 of the film magazine when the supply and take-up chambers are received in the two compartments. See FIGS. 1 and 4. A known shutter 51 for uncovering a taking lens (not shown) to take a picture is mounted inside the backframe opening 49.

Figure 4:
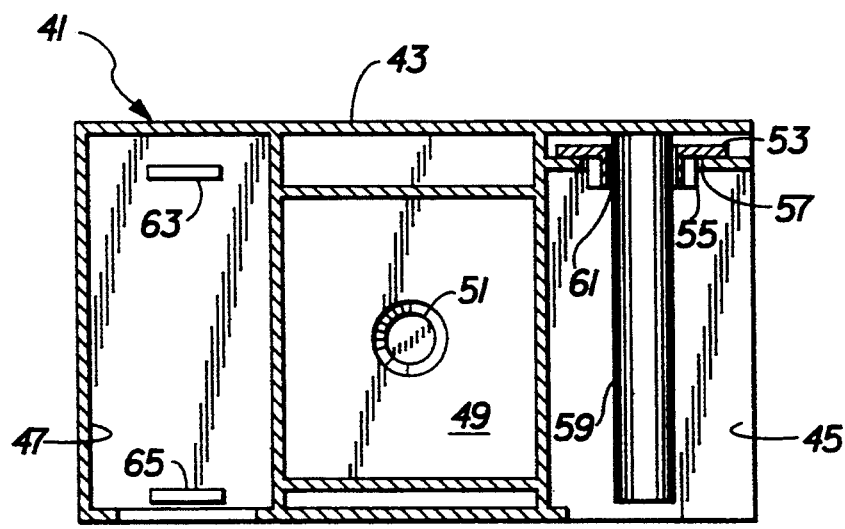
FIG. 4 is a cross-sectional view of the camera as seen in the direction of the arrows 4, 4 in FIG. 1.

A manually rotatable film advance thumbwheel 53 is supported above the holding compartment 45 as shown in FIGS. 1 and 4, and it has an underside ring-shaped winding key 55 that protrudes through a bearing-hole 57 in the body 43 to engage with the exposed top end 19 of the take-up spool 17 of the film magazine 1 to rotate the spool to take up successive exposed frames of the filmstrip 9. A flash capacitor 59 for a known built-in electronic flash unit (not shown) is fixed to the body 3 to project through a center-hole 61 in the thumbwheel 53 and into the holding compartment 45. A pair of electrical contacts 63 and 65 connected to a flash circuit board, in turn connected to the capacitor 59, are supported in the holding compartment 47.

Magazine Loading Method

To load the film magazine 1 into the camera 41, the take-up chamber 5 is manually grasped to slide the coaxial bore 21 of the take-up spool 17 longitudinally over the capacitor 59 until the exposed top end 19 of the spool is brought into engagement with the winding key 55 of the thumbwheel 53. Then, the supply chamber 3 is manually grasped to pivot the film magazine 1 about the capacitor 59 (with the winding key 55 engaged with the exposed top end 19) to swing the supply chamber into the holding compartment 47 until the positive and negative poles 31 and 33 of the battery abut the respective electrical contacts 63 and 65. The electrical contacts 63 and 65 in abutment with the positive and negative poles 31 and 33 serve as bearing supports for the supply spool 13.

The invention has been described with reference to a preferred embodiment. However, it will be appreciated that variations and modifications can be effected by a person of ordinary skill in the art without departing from the scope of the invention.

PARTS LIST FOR FIGS. 1-4

1. film magazine
3. film supply chamber
5. film take-up chamber
7. interconnecting bridge portion
9. filmstrip
11. film roll
13. film supply spool
15. exposure window
17. film take-up spool
19. exposed top end of take-up spool
21. coaxial bore in take-up spool
23. coaxial bore in supply spool
25. open top end of bore in supply spool
27. open bottom end of bore in supply spool
29. battery
31. positive pole of battery
33. negative pole of battery
41. camera
43. body
45. holding compartment
47. holding compartment
49. backframe opening
51. shutter
53. film advance thumbwheel
55. winding key
57. bearing-hole
59. flash capacitor
61. center-hole
63. electrical contact
65. electrical contact

What is claimed is:

1. A camera intended to be used with a film magazine which contains a film take-up spool having an exposed end at the magazine exterior and a coaxial bore opening to the exposed end, said camera comprising:

rotatable film rewinding means for engaging the exposed end of the take-up spool at the magazine exterior to rotate the take-up spool; and flash capacitor means projecting longitudinally from said rewinding means to be received in the coaxial bore of the take-up spool to guide the film magazine for engagement of the exposed end of the take-up spool with said rewinding means.

2. A camera for a film magazine provided with a film supply chamber which contains a roll film and with a film take-up chamber which contains a film take-up spool having an exposed end at the magazine exterior and a coaxial bore opening to the exposed end, said camera comprising:

rotatable film rewinding means for engaging the exposed end of the take-up spool at the magazine exterior and rotating the take-up spool to wind a filmstrip from the film supply chamber into the film take-up chamber;

a holding compartment for receiving the film supply chamber of the film magazine; and flash capacitor means projecting longitudinally from said rewinding means to be received in the coaxial bore of the take-up spool to guide the film magazine for engagement of the exposed end of the take-up spool with said rewinding means and to serve as a fulcrum support about which the film magazine can be pivoted at the film take-up chamber to swing the film supply chamber into said holding compartment.

3. A camera for a film magazine provided with a film supply chamber which contains a battery having a pair of exposed contacts at the magazine exterior and with a film take-up chamber which contains a film take-up spool having an exposed end at the magazine exterior and a coaxial bore opening to the exposed end, said camera comprising:

rotatable film rewinding means for engaging the exposed end of the take-up spool at the magazine exterior and rotating the take-up spool to wind a filmstrip from the film supply chamber into the film take-up chamber;

a holding compartment for receiving the film supply chamber of the film magazine;

flash capacitor means projecting longitudinally from said rewinding means to be received in the coaxial bore of the take-up spool to guide the film magazine for engagement of the exposed end of the take-up spool with said rewinding means and to serve as a fulcrum support about which the film magazine can be pivoted at the film take-up chamber to swing the film supply chamber into said holding compartment; and a pair of electrical contacts connected to said capacitor and located in said holding compartment to abut the exposed contacts of the battery when the film magazine is pivoted about said capacitor to swing the film supply chamber into said holding compartment.

4. A combination of a camera and a film magazine, wherein said film magazine comprises:

a film supply chamber which contains a battery having a pair of exposed contacts at the magazine exterior; and a film take-up chamber which contains a film take-up spool having a coaxial bore opening to the magazine exterior, and wherein said camera comprises:

a holding compartment for receiving said film supply chamber of said film magazine;

flash capacitor means projecting longitudinally to be received in said coaxial bore of said take-up spool to serve as a fulcrum support about which said film magazine can be pivoted at said film take-up chamber to swing said film supply chamber into said holding compartment; and a pair of electrical contacts connected to said capacitor and located in said holding compartment to abut said exposed contacts of said battery when said film magazine is pivoted about said capacitor to swing said film supply chamber into said holding compartment.

5. A combination of a camera and a film magazine, wherein said film magazine comprises:

a film supply chamber which contains a film roll;

a film take-up chamber which contains a film take-up spool having a coaxial bore opening to the magazine exterior; and film guide means interconnecting said film supply chamber and said film take-up chamber for guiding a filmstrip from said film supply chamber to said film take-up chamber and having a film exposure window, and wherein said camera comprises:

rotatable film rewinding means for engaging said exposed end of said take-up spool at said magazine exterior and rotating said take-up spool to wind a filmstrip from said film supply chamber into said film take-up chamber;

a backframe opening;

a holding compartment for receiving said film supply chamber of said film magazine; and flash capacitor means projecting longitudinally from said rewinding means to be received in said coaxial bore of said take-up spool to guide said film magazine for engagement of said exposed end of said take-up spool with said rewinding means and to serve as a fulcrum support about which said film magazine can be pivoted at said film take-up chamber to swing said film guide means to position said film exposure window over said backframe opening and to swing said film supply chamber into said holding compartment.

6. A method of loading into a camera a film magazine provided with a film supply chamber which contains a battery having a pair of exposed contacts at the magazine exterior and with a film take-up chamber which contains a film take-up spool having an exposed end at the magazine exterior and a coaxial bore opening to the exposed end, said method comprising:

manually sliding the coaxial bore of the take-up spool onto a flash capacitor of the camera until rotatable film winding means of the camera from which the capacitor projects engages the exposed end of the take-up spool; and manually pivoting the film magazine about the capacitor at the film supply chamber, with the film winding means engaged with the exposed end of the take-up spool, to swing the film supply chamber into a holding compartment of the camera until the exposed contacts of the battery abut respective electrical contacts located in the holding compartment and connected to the capacitor.

* * * * *